United States Patent
Hirotsune et al.

(10) Patent No.: US 6,788,642 B2
(45) Date of Patent: Sep. 7, 2004

(54) OPTICAL RECORDING MEDIUM HAVING UNRECORDABLE RESTRICTED BLOCK(S), AND SYSTEMS INCORPORATING SAME

(75) Inventors: Akeimi Hirotsune, Saitama (JP); Harukazu Miyamoto, Higashimurayama (JP); Yoshiko Nishi, Chofu (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 09/929,127

(22) Filed: Aug. 15, 2001

(65) Prior Publication Data

US 2002/0145966 A1 Oct. 10, 2002

(30) Foreign Application Priority Data

Apr. 6, 2001 (JP) ........................................ 2001-107928
Apr. 19, 2001 (JP) ........................................ 2001-120469

(51) Int. Cl.[7] ............................................... G11B 7/24
(52) U.S. Cl. ............................ 369/275.3; 369/47.14; 369/53.15
(58) Field of Search ............................ 369/275.3, 47.27, 369/47.14, 53.21, 53.15, 53.17, 53.16; 711/163; 705/57

(56) References Cited

U.S. PATENT DOCUMENTS

| | | | | |
|---|---|---|---|---|
| 5,978,336 A | * | 11/1999 | Mine et al. | 369/47.14 |
| 6,160,778 A | * | 12/2000 | Ito et al. | 369/53.15 |
| 6,182,240 B1 | * | 1/2001 | Mine | 714/5 |
| 6,385,744 B1 | * | 5/2002 | Ando et al. | 714/54 |
| 6,510,114 B1 | * | 1/2003 | Yeo et al. | 369/53.2 |
| 6,564,345 B1 | * | 5/2003 | Kim et al. | 714/723 |
| 6,606,285 B1 | * | 8/2003 | Ijtsma et al. | 369/47.1 |

* cited by examiner

*Primary Examiner*—Tan Dinh
(74) *Attorney, Agent, or Firm*—Antonelli, Terry, Stout & Kraus, LLP

(57) ABSTRACT

In a medium having a restriction on its function, which has a extremely low overwrite cyclability as compared with a common one, information is arranged so as to allow restricted write and read operations in a commonly used current write and read drive, i.e., the medium is subjected to specific formatting. It is possible to perform write and read operations with security. The specific format can be performed with parameters taking into consideration special-purpose use conditions (i.e., overwrite cyclability). Consequently, it becomes possible to provide a low-priced information recording medium.

20 Claims, 10 Drawing Sheets

PDL (PRIMARY DEFECT LIST)

| NUMBER OF ENTRIES=N |
|---|
| DEFECT ADDRESS #1 |
| DEFECT ADDRESS #2 |
| DEFECT ADDRESS #3 |
| ⋮ |
| DEFECT ADDRESS #N |
| ⋮ |

REGISTERED ENTRIES (N): DEFECT ADDRESS #1 through DEFECT ADDRESS #N

AREA FOR ADDITIONAL ENTRY REGISTRATION

FIG. 11(b)

SDL (SECONDARY DEFECT LIST)

| HEADER | NUMBER OF ENTRIES=M | |
|---|---|---|
| SLR=0 | DEFECT ADDRESS #10 | REPLACEMENT ADDRESS #1 |
| SLR=1 | DEFECT ADDRESS #11 | — |
| SLR=0 | DEFECT ADDRESS #12 | REPLACEMENT ADDRESS #2 |
|  |  |  |
|  |  |  |
| SLR=0 | DEFECT ADDRESS #X | REPLACEMENT ADDRESS #Y |
|  | ⋮ | ⋮ |

REGISTERED ENTRIES (M)

AREA FOR ADDITIONAL ENTRY REGISTRATION

OPTICAL RECORDING MEDIUM HAVING UNRECORDABLE RESTRICTED BLOCK(S), AND SYSTEMS INCORPORATING SAME

BACKGROUND OF THE INVENTION

The present invention relates to the arrangement of recorded data on an information recording medium. More particularly, it relates to an information recording medium including information arranged thereon so as to allow restricted writing and reading in a commonly current write and read drive, and a system for performing restricted write and read operations on and from the information recording medium.

One example of a conventional optical recording system will be described with reference to FIGS. 3 and 5 as one example of an information recording system.

FIG. 3 shows a block diagram of a conventional optical write and read drive. The light beams emitted from a laser 25 (with a wavelength of about 660 nm for a DVD-RAM), which is a part of a head 2, are collimated into a nearly parallel light beam 22 through a collimating lens 24. The light beam 22 is applied onto an optical disk 11 through an objective lens 23 so as to form a spot 21. Thereafter, the reflected light beams are guided through a beam splitter 28, a hologram element 29, or the like, to a servo detector 26 or a signal detector 27. A signal from each detector is subjected to an add/subtraction process to become a servo signal, such as a tracking error signal or a focus error signal, which is then inputted to a servo circuit. The servo circuit controls the positions of a driving means 31 of the objective lens 23 and the whole optical head 2 based on the tracking error signal and focus error signal that has been obtained, so that the optical spot 21 is positioned in an objective writing and reading area. An added signal from the detector 27 is inputted to a signal reproduction block 41. In a signal processing circuit, the inputted signal is subjected to a filtering process and a frequency equalizing process, and then is subjected to a digitization process. The digital signal thus subjected to a digitization process is processed by an address detector and a demodulation circuit. Based on the address signal detected by the address detector, a microprocessor calculates the position of the optical spot 21 on the optical disk 11 and controls a position control means, thereby to position the optical head 2 and the optical spot 21 at an objective recording unit area (sector).

If the instruction from a host to the optical write and read drive is a writing instruction, the microprocessor receives recording data from the host and stores it in a memory, while controlling the position control means to position the optical spot 21 at a position in an objective recording area. The microprocessor checks that the optical spot 21 has been properly positioned in the recording area by an address signal from the signal reproduction block 41, and then controls a laser driver and the like to write the data in the memory on an objective recording area.

An address signal is arranged in every information recording unit area, at the beginning portion of the recording unit area, as shown in FIG. 6. Therefore, it is possible to check the position of the optical spot immediately before writing by detection of the address signal.

FIG. 5 shows an example of the flow of operation of an optical recording system for driving the DVD-RAM disk specified in International Standard ISO/IEC-16824, or the like, which is a rewritable DVD or DVD-RAM representing one example of the optical recording system described above.

When a disk is loaded, or the power of the optical recording system is turned on, first, the optical recording system performs a process for discriminating the types of media. In general, it has a function of reading a CD-ROM or DVD-ROM which is a read-only medium, in addition to the DVD-RAM medium. Therefore, the optical recording system first performs a media type discrimination process to discriminate which one of the types described above the medium corresponds to. Individual systems perform the discrimination process in mutually different ways. For example, some systems discriminate the types of media from the analogue characteristics of the reflectance and the reproduced signal, such as the focus error signal, and other systems read a physical information area provided on a disk substrate and then discriminate the types of media based on the contents (data).

If the optical recording system identifies the type of the medium as a rewritable type, i.e., a DVD-RAM, first, it checks the recorded contents of a defect management information area, and the like, and thereby checks whether the optical disk has been physically formatted. If the optical disk has not been physically formatted, a wait period is initiated until a physical format command is issued from a host or a user.

If the optical disk has been physically formatted, the optical recording system performs a process of preparation for writing, such as a calibration process or logical consistency verification, and then it enters a wait state for a command from a user or host. Upon receiving some command, the optical recording system checks the type of the command. Then, if it is a write command, the optical recording system performs a writing process. For commands of read, format, unloading of the disk, and the like; the optical recording system performs respective corresponding processes. In general, these processes are normally terminated. However, in case of an unsuccessful write operation for an unexpected reason, the system performs an error handling process, such as retry or replacement.

In general, with a DVD-RAM, during the writing process, whether the recording data has been normally written or not is checked by actually reading the recorded data. If required, replacement is performed by using another recording unit area, thereby to enhance the reliability of the recorded data. The management information on the reallocation of recording areas due to the replacement is written in a specific area (defect management area).

Thus, the DVD-RAM is an optical recording system having very high reliability. However, since the recorded data is basically freely rewritable, it is not possible to eliminate the possibility that the important data already recorded is erased or rewritten due to a wrong operation by a user, a malfunction of the host, or the like.

Further, replacement is performed on the following precondition: even if rewriting processes are performed for a sufficiently larger number of times than the number of defects storable in the defect management area, it is possible to perform writing and reading with no problem.

As one method of protection, there is a so-called write protection function. However, the write protection can be freely revoked by a user. Accordingly, it is still impossible to prevent data corruption by the wrong operation of a user.

An example of a magneto-optical disk will be described as a proposal for overcoming such a problem. The magneto-optical disk is a rewritable storage medium that is capable of erasing and rewriting user data with respect to a user data area including user data recorded therein. However, there is a demand for this to be used as a WORM type storage medium not capable of erasing and rewriting user data.

For example, with a CCW method specified in International Standard ISO-1EC11560 (or a MO-WORM method), media type identification data indicative of the type of the magneto-optical disk is included in a control information area provided in an area outside the user data area of the magneto-optic disk. As a result, it is possible to identify whether the magneto-optical disk is of a rewritable type or a WORM type based on the media type information.

The magneto-optical disk drive is so configured that, if the WORM type magneto-optical disk is loaded therein, the erasing operation and the rewriting operation are not to be performed with respect to the user data area including user data already written therein. Namely, the magneto-optical disk, which is originally of a rewritable type, is provided with a write protection function for preventing erasing and overwriting. Consequently, it becomes possible to access a WORM type magneto-optical disk having a write protection function and a rewritable magneto-optical disk with the same magneto-optical disk drive. Accordingly, the magneto-optical disk drive finds a wider range of application, and it is also possible to reduce the media cost.

However, if an attempt is made to apply the same method to an optical disk system with only a rewritable type standard already set therein, such as a DVD-RAM, the following problem occurs.

The standard of the rewritable disk already exists, and such a disk is commercially available. An optical disk system for driving an optical disk in conformity with the standard also already exists. Even if media type data of the media type identification data area is newly defined, as in the example of the magneto-optical disk under such circumstances, it is not possible to change the existing drive. Therefore, it is impossible to control the operation of the existing optical disk drive having no write protection function.

Actually, as described above, all optical recording systems do not utilize media type identification data for discriminating the media types. Further, even if novel encoded data which has been undefined in the art is written to the media type identification data, the operation has been undefined because a conventional optical recording system cannot recognize the meaning of the encoded data.

Namely, in the prior-art example, there has been a risk that the data on the optical recording medium is corrupted by a mistake with the existing recording drive when a medium with a restriction on its function, such as a low-priced medium providing low overwrite cyclability is introduced.

SUMMARY OF THE INVENTION

It is an object of the present invention to provide a secure optical recording system which imposes a restriction on its method of use, for example, imposes a substantial restriction on the rewrite count of a medium without changing the hardware or physical specifications, and eliminates a risk that recorded information is corrupted or recorded information is lost as with a conventional drive even for a medium with low overwrite cyclability or a low-priced medium.

The following features were Used in order to attain the object of the present invention.

(1) Out of user recording blocks of the information recording medium, at least one or more blocks have been set to be unrecordable, unreadable, or inaccessible restricted blocks. The term "restricted" as herein used denotes that a restriction is imposed on the rewrite count of a specific area, such as a defect management area.

Consequently, it is possible to disable the substantial use thereof in a system which does not recognize the presence of the restricted block. Accordingly, it becomes possible to force the use of specific control software or a specific logical format, thereby making it possible to restrict the method of use of the disk. For example, it becomes possible to prohibit the use of a disk shipped with a specific logical format by reformatting the disk in another format, or the like. By utilizing this fact, it becomes possible to use a medium with a restriction on its overwrite cyclability with security, as will be described later.

(2) The user recording block has been set to be an error correction code (ECC) block composed of a plurality of user sectors. Consequently, it becomes easy to apply the present invention to a system which records data in a unit of the ECC blocks (such as a DVD-RAM). The ECC block, which is the unit for recording, is not necessarily required to be in agreement with a sector, which is the minimum unit of the addressable block as seen from the host system. For example, in a DVD system, 2048-byte user data can be stored in one sector, and the ECC block is composed of 16 sectors, i.e., data of about 32 kB.

(3) The user sectors individually have independent address numbers, and all the user recording blocks to which the user sectors belong, which have the smallest 257, or more desirably 513, address numbers out of the user sectors, have been set to be at least unrecordable, unreadable, or inaccessible restricted blocks. Alternatively, all the user recording blocks to which the user sectors belong, which have the largest 257 address numbers out of the user sectors, have been set to be at least unrecordable, unreadable, or inaccessible restricted blocks. Namely, the lowermost 257 blocks or 513 blocks, and/or the uppermost 257 blocks, in the user address space have been at least substantially set to be disabled.

Consequently, it is possible to substantially make it impossible to format or reformat a recording medium for use by ordinary logical formatting software whereby a file system area is arranged at the beginning portion of the user area. Therefore, it is possible to substantially restrict the use of the format using other formatting software than the objective software of the present invention. Thus, it is possible to restrict the method of disk use with reliability. Particularly, it is possible to restrict the ordinary formatting with reliability in a UDF file system using sectors 256 and 512 as reference sectors (AVDPs: Anchor Volume Descriptor Pointers). Since some file systems allocates system information to the end portion of the volume space (data area), it is more desirable for the disabled area to be also allocated to the end portion.

(4) An information recording medium is used, which comprises: at least a plurality of independently writable and readable user recording blocks; and spare blocks each for replacing a user recording block having a defect, wherein at least one or more blocks out of the spare blocks have been set to be an unrecordable, unreadable, or inaccessible restricted blocks.

Consequently, it becomes possible to apply the write restriction method even to a system having a replacement function (ex., DVD-RAM) with reliability.

For achieving the foregoing object, it is desirable to use an information recording medium, which comprises: at least a plurality of independently writable and readable user recording blocks, and three or more blocks of spare blocks, each for replacing a user recording block having a defect, wherein at least three or more consecutive blocks out of the spare blocks are unrecordable, unreadable, or inaccessible restricted blocks. In a conventional DVD-RAM system, when a defect exists in the block itself to be used as a spare block, its adjacent recording blocks are automatically reallocated as spare blocks. However, if three or more consecutive blocks are disabled, as described above, it becomes impossible to normally perform the reallocation function. Consequently, it is possible to impose a restriction on the use with higher reliability.

(5) As a means for implementing the unrecordable, unreadable, or inaccessible restricted blocks a medium is used in which address numbers are arranged as the physical address data, each made up of at least a code indicative of an address number and an address error detection code for verifying the correctness of the address number, and some of the address numbers are at least included, in each of which there is a mismatch between the codeword indicative of an address number and the error detection code for verifying the correctness of the address number. Consequently, with a conventional drive, address detection is disabled, so that the corresponding portion becomes unrecordable, unreadable, or inaccessible. Since some systems ignore a little address error, it is recommendable that a plurality of, and more desirably three or more blocks, each with address mismatch, are included in the blocks in order to impose a restriction on writing with higher reliability.

(6) The address number is arranged as the physical address data made up of at least a code indicative of an address number and an address error detection code for verifying the correctness of the address number on the recording medium. As for the physical address data corresponding to the unrecordable, unreadable, or inaccessible restricted blocks out of the physical address data, each address number indicated by the physical address data has been set to be different from the address number of the block. Consequently, it becomes impossible to gain the objective address with a conventional drive, so that the corresponding portion becomes unrecordable, unreadable, or inaccessible.

(7) An information recording medium is used which comprises at least two or more independently writable and readable user recording blocks, wherein out of the user recording blocks, at least one or more blocks are unrecordable, unreadable, or inaccessible restricted blocks. Further, a map or list of information indicative of the existing positions or addresses of all the restricted blocks are prerecorded as encoded data or encrypted data on a specific area or desirably on a read-only area where information is recorded by embossed pits or the like on the information recording medium.

Consequently, only a processing system capable of decoding the specific authorized cipher can use the recording medium of the present invention. Therefore, it becomes possible to ensure security.

(8) The recording medium is to be previously logically formatted so that an area, except for that of the unrecordable, unreadable, or inaccessible restricted blocks, is a substantial user area prior to shipment.

Consequently, it becomes possible to perform writing and reading on the medium of the present invention without any specific software in a conventional system. Even in such a case, the medium substantially becomes unusable if it is formatted in another system, and hence it is possible to substantially restrict the method of use so as to be different from the intended method of use of an information recording medium provider. Therefore, it becomes possible that the recording medium manufacturer assumes the restricted use method of the medium. Consequently, the flexibility of the specifications is increased, so that it becomes possible to provide a substantially low-priced recording medium.

(9) The write restriction as described above has been implemented by configuring a system such that an information recording medium having a write and read restriction comprising at least two or more independently writable and readable user recording blocks, out of the user recording blocks, at least one or more blocks being unrecordable, unreadable, or inaccessible restricted blocks, is used in a computer system or a write and read drive having a processing function for performing read and write control, such that an area except for the restricted blocks, is a substantial user area.

This system is so configured that, for example, a standard read and write drive is connected to a host onto which specific control software has been installed.

(10) An information recording and reproducing system having a write and read restriction has been configured which comprises: an information recording medium having a write and read restriction comprising at least two or more independently writable and readable user recording blocks, out of the user recording blocks, at least one or more blocks being unrecordable, unreadable, or inaccessible restricted blocks; and a means having a processing function for reading encoded data or encrypted data stored in a specific area on the recording medium, and decoding or decrypting the read data to obtain layout information of the restricted blocks, and performing at least one of write and read control or logical format, such that all the restricted blocks are not substantially user areas based on the restricted block layout information obtained by using the information recording medium.

Consequently, it becomes easy to add high security to the specification restriction. Accordingly, it becomes easy to restrict the use by an unauthorized user, or to restrict the use of software.

(11) An information recording and reproducing system has been configured whereby the restricted blocks are substantially excluded from the user area by registering the restricted blocks as defects, or the restricted blocks are substantially excluded from the user area by registering the restricted blocks as invisible files.

This enables the use of a restricted disk.

(12) An information recording medium is used which comprises: at least a plurality of independently writable and readable user recording blocks; and spare blocks each for replacing a user recording block having a defect, wherein the number of the spare blocks has been set to be smaller than the overwrite cyclability of the recording medium.

For example, in a 120-mm-dia DVD-RAM (4.7 GB per side), a PSA (primary spare area) and an SSA (supplementary spare area) can be ensured as spare blocks. Out of these areas, only the PSA is assigned at the time of shipment, and further, a part of the area is previously registered as used blocks. Consequently, the number of newly usable spare blocks is set to be smaller than the overwrite cyclability determined by the physical characteristics of the recording layer of the medium.

As a result, the write and read drive performs replacement registration when a defect is newly found during use of the medium, and every time the replacement registration process is performed, the defect management area, which is a specific area of the medium, is rewritten once. By using this technique, it is possible to restrict the number of cycles for rewriting the defect management area associated with the replacement to not more than the number of usable spare blocks, i.e., the rewrite count of the medium. This eliminates the danger that the rewrite count of the defect management area exceeds the overwrite cyclability. Consequently, the reliability of the medium is improved.

(13) An information recording medium is used, which comprises: at least a plurality of independently writable and readable user recording blocks; spare blocks each for replacing a user recording block having a defect; and at least a defect management table recording area for recording the relationship between the defective blocks and the spare blocks, wherein a plurality of the defective blocks and the spare blocks have been previously recorded in the defect management table, and the number of residual blocks registrable in the defect management table has been set to be smaller than the overwrite cyclability of the recording medium.

For example, in a 120-mm-dia DVD-RAM (4.7 GB per side), the defect management tables are of two types: a PDL (primary defect list) table and a SDL (secondary defect list) table. Out of these, in the PDL table, about 7000 sectors of defects can be registered, and about 4000 blocks of defects can be registered in the SDL table. In this way, most of the entries of the SDL table are assigned by replacement registration. Further, a part of them are previously registered as having been used to be the used blocks. Consequently, the number of defective blocks usable by additional assignment is set to be smaller than the overwrite cyclability determined by the physical characteristics of the recording layer of the medium.

As a result, the write and read drive performs defect registration when a defect is newly found during use of the medium, and every time the replacement registration process is performed, the defect management area, which is a specific area of the medium, is rewritten once. By using this technique, it is possible to restrict the number of cycles for rewriting the defect management area associated with the defect management to not more than the number of usable spare blocks, i.e., the overwrite cyclability of the recording medium. This eliminates the danger that the rewrite count of the defect management area exceeds the overwrite cyclability. Consequently, the reliability of the medium is improved. Herein, the defect registration denotes that a defect is registered as a defect, and it is not necessarily identical with the replacement assignment.

Any of the replacement assignment in the foregoing section (12) and the defect registration in the foregoing section (13) results in rewriting of the defect management area. Therefore, it is desirable that the sum of both the number of the spare blocks and the number of residual blocks registrable as defects is set to be smaller than the overwrite cyclability of the recording medium.

Further, at worst, there can be present the case where the replacement assignment described in the foregoing section (12) is performed after the defect assignment described in the foregoing section (13), and then, after spending the spare blocks, defect registration is performed with no replacement as in the means (13). Any of the steps results in rewriting of the defect management area. Therefore, it is more desirable that the number of the spare blocks and the number of the residual blocks registrable as defects are set to be smaller than one third of the overwrite cyclability of the recording medium, respectively.

(14) The total number of the restricted blocks on the information recording medium has been set to be larger than the total number of the recording blocks registrable in the defect management table. Consequently, even if an attempt is made to perform reformatting with certification, all the u~xrecordable blocks (restricted blocks) cannot be registered as defects. Accordingly, reformatting is unsuccessfully terminated. Namely, it is possible to disable (restrict) reformatting.

Other and further objects, features and advantages of the invention will appear more fully from the following description.

BRIEF DESCRIPTION OF THE DRAWINGS

A preferred form of the present invention is illustrated in the accompanying drawings, in which:

FIGS. 11(a) and 11(b) are diagrams respectively showing the configurations of defect management lists.

DETAILED DESCRIPTION OF THE PREFERRED EMBODIMENTS

EXAMPLE 1

Figure 3:
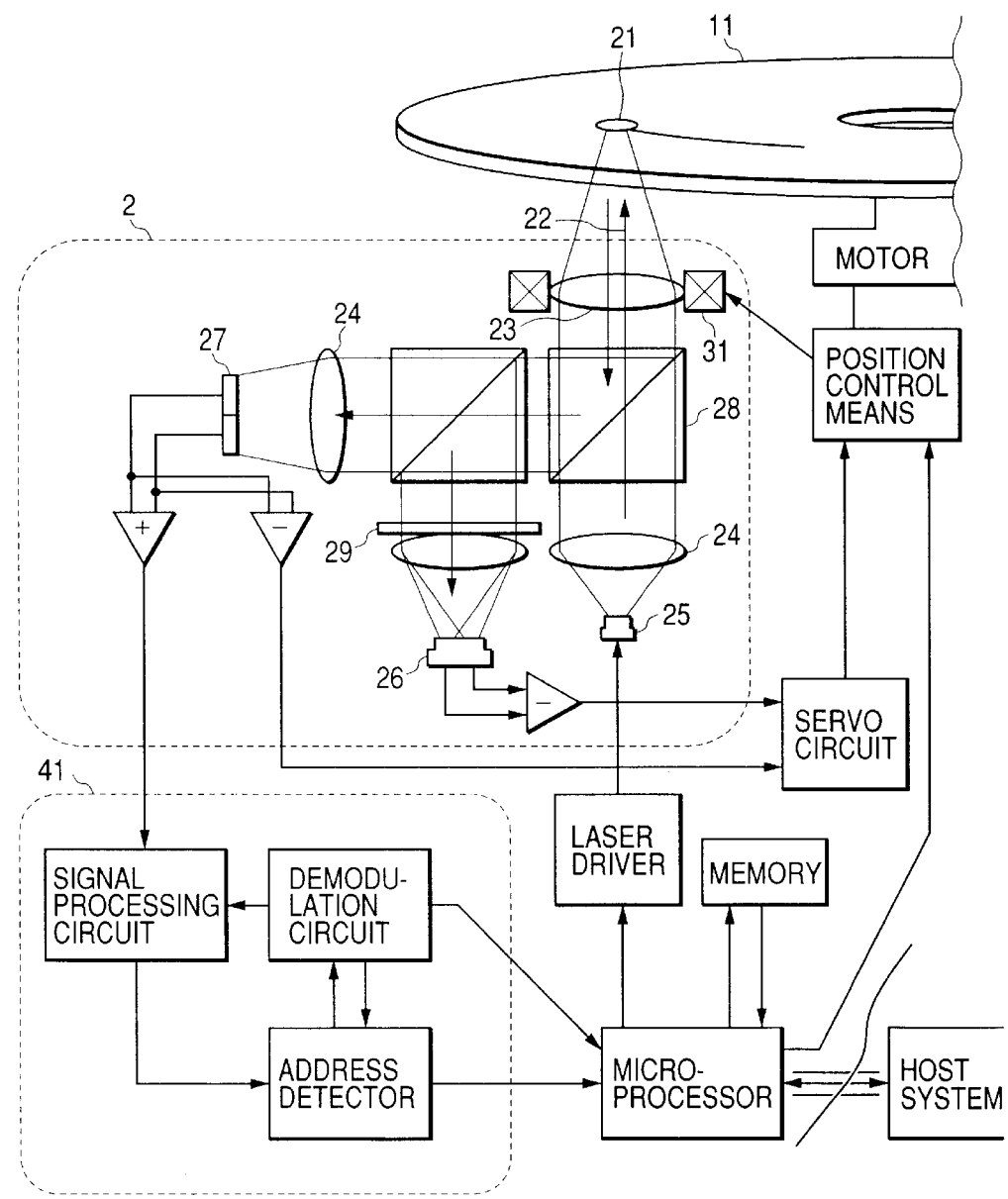
FIG. 3 is a block diagram showing another example of an optical write and read drive.

FIG. 3 shows a block diagram of one example of a DVD-RAM write and read drive which is a conventional optical information recording drive. First, the operation in the case where a conventional medium with no write restriction is loaded in this drive will be described. The light beams emitted from a laser 25 (with a wavelength of about 660 nm for a DVD-RAM), which is a part of a head 2, are collimated into a nearly parallel light beam 22 through a collimating lens 24. The light beam 22 is applied onto an optical disk 11 through an objective lens 23 to form a spot 21. Thereafter, the reflected light beams are guided through a beam splitter 28, a hologram element 29, or the like, to a servo detector 26 or a signal detector 27.

A signal from each detector is subjected to an add/subtraction process to become a servo signal such as a tracking error signal or a focus error signal, which is then inputted in a servo circuit. The servo circuit controls the positions of the objective lens 23 and the whole optical head 2 based on the tracking error signal and focus error signal thus obtained, so that the optical spot 21 is positioned in an objective writing and reading area. An added signal from the detector 27 is inputted to a signal reproduction block 41. By a signal processing circuit, the inputted signal is subjected to a filtering process and a frequency equalizing process, and then to a digitization process.

Figure 2:
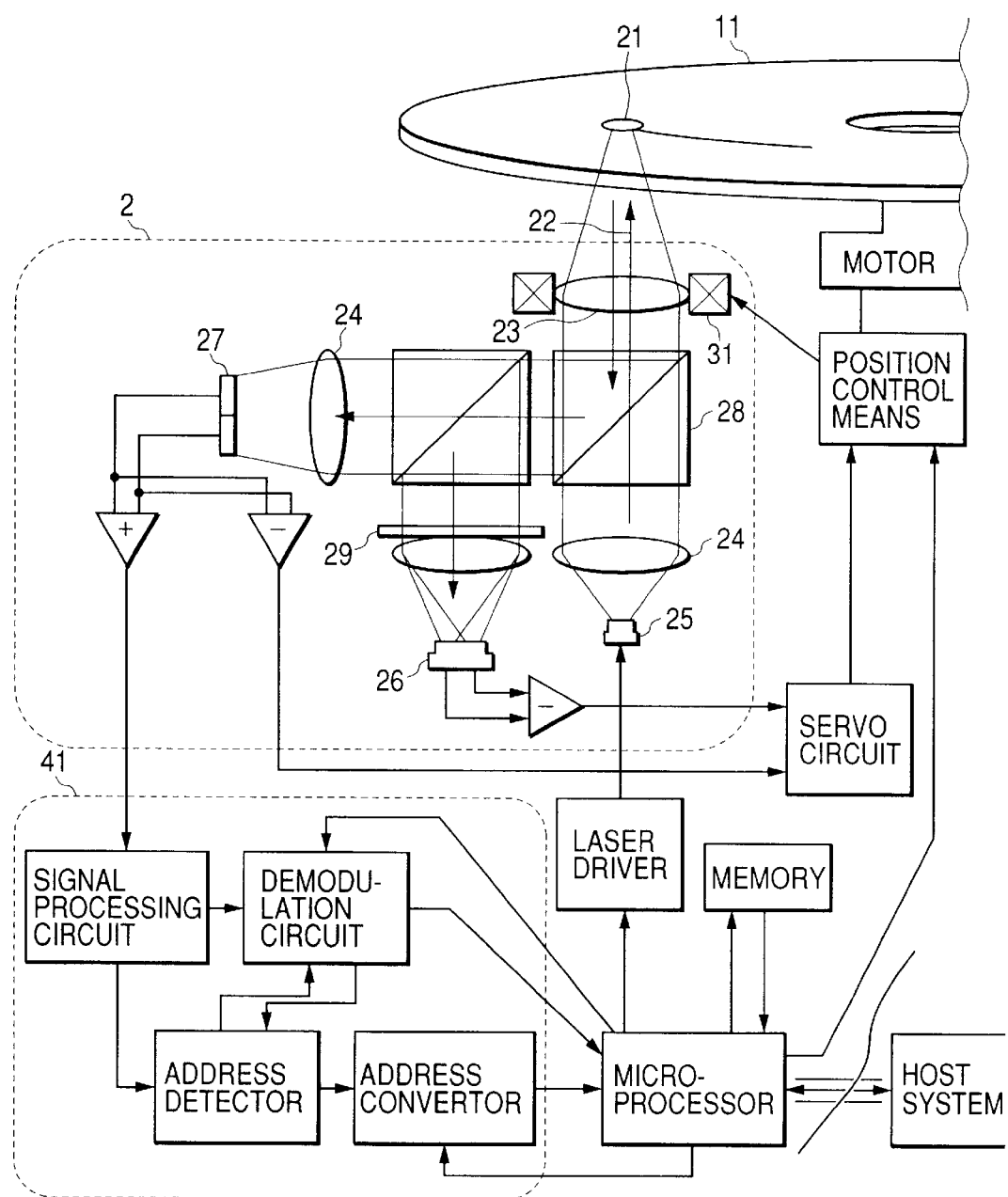
FIG. 2 is a block diagram showing one example of an optical write and read drive.

The digital signal thus subjected to a digitization process is processed by an address detector and a demodulation circuit. A physical sector number (PSN), which is physical address information, is obtained by the address detector. The address information herein obtained corresponds to the recording sector of the medium. In a DVD-RAM system, the PSN at the beginning of the user data area starts from "31000h". However, in such an external recording drive to be connected to a host, such as a PC, as the drive of the present invention, if the start address of the recording area varies from one type to another type of drive, the process at the host becomes complicated. Therefore, an access is generally made from the host by using a logical block address (LBA). In the drive of this example, the translation between LBA and PSN is carried out in a microprocessor in the drive. However, an address converter may also be used, as provided in the example of FIG. 2.

Figure 4:
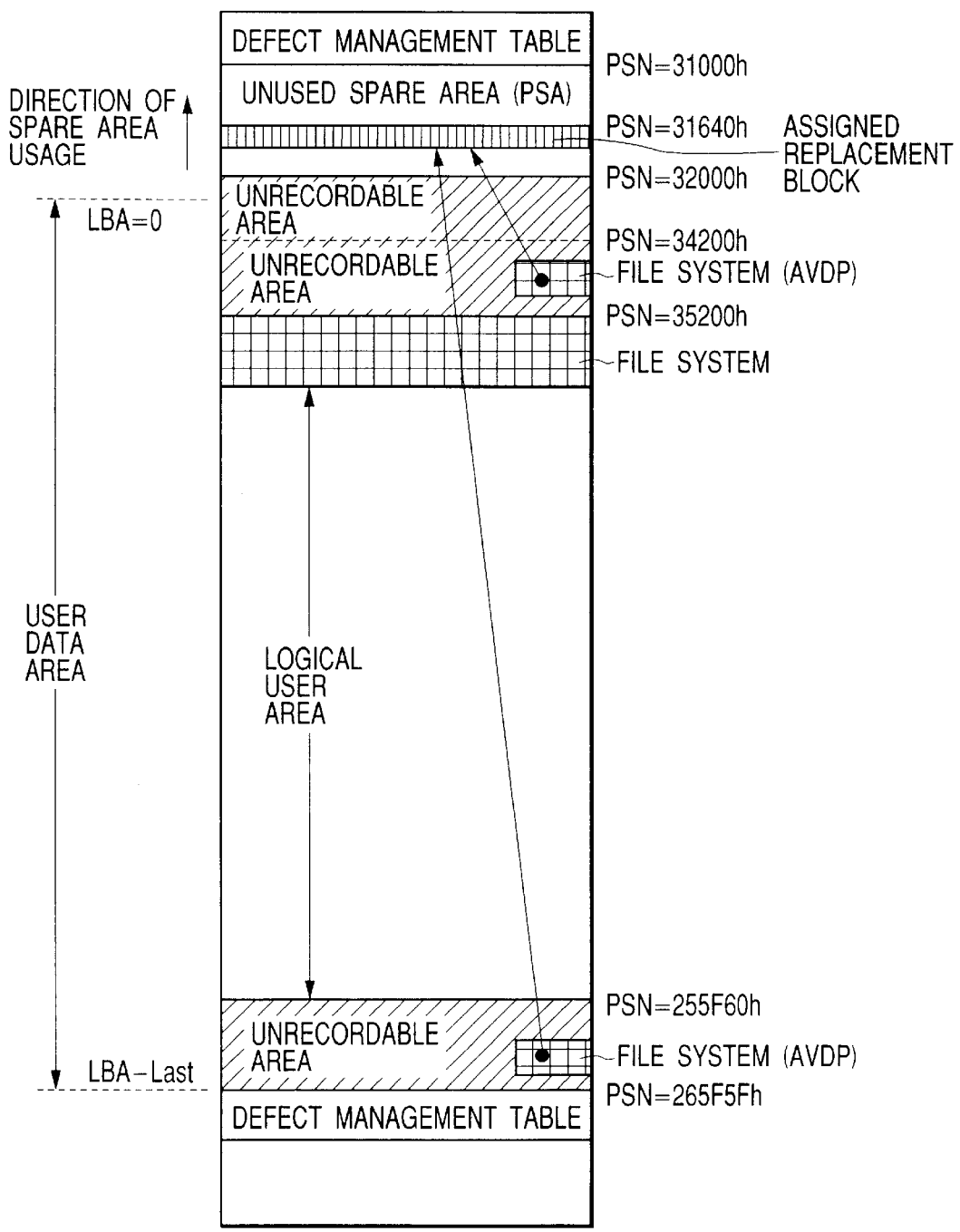
FIG. 4 is a diagram showing an example of the logical format of an information recording medium of the present invention.
Figure 5:
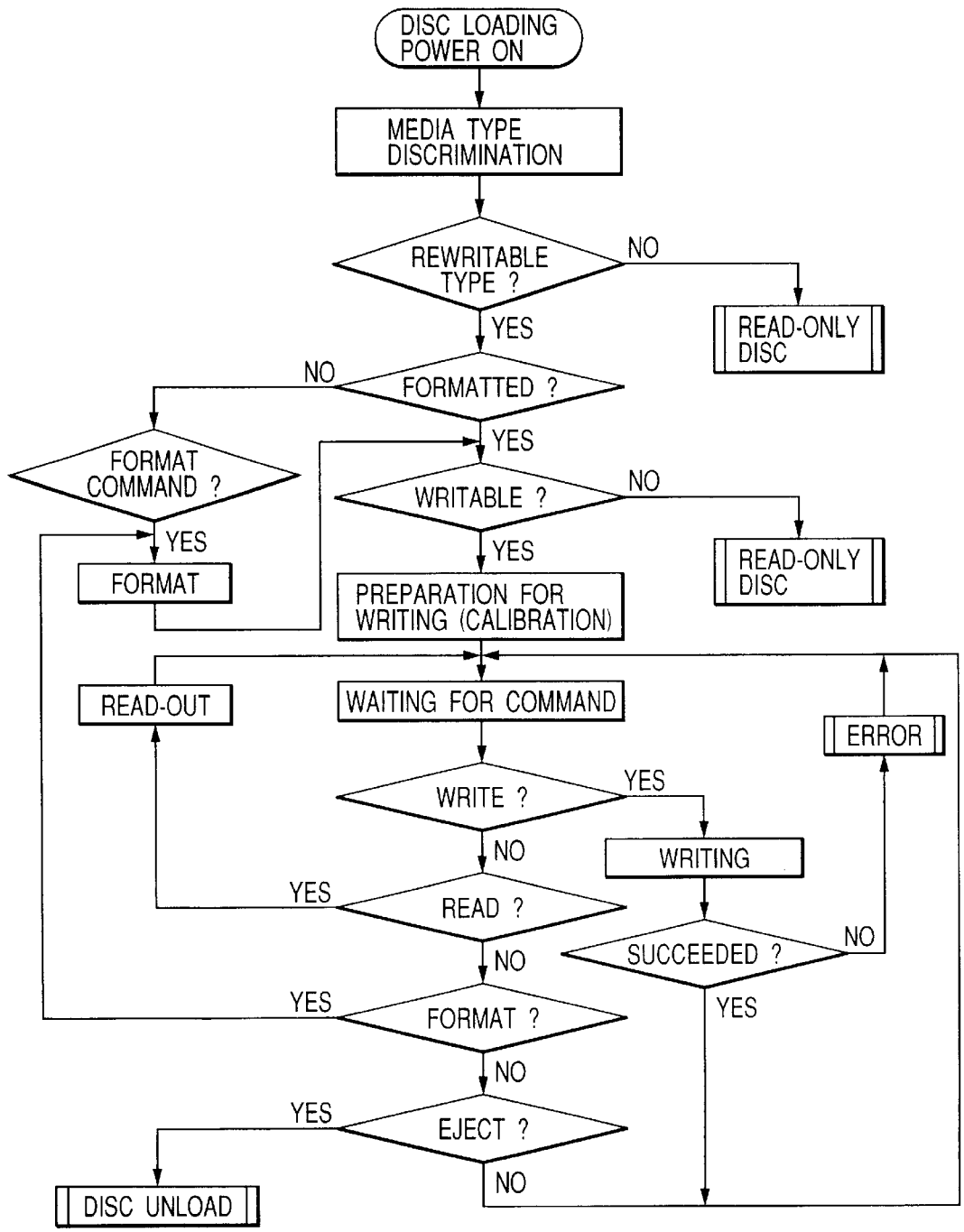
FIG. 5 is a flowchart illustrating the operation with the optical write and read drive.

The microprocessor discriminates the types of medium loaded therein (see FIG. 4), and if the medium is a DVD-RAM, the microprocessor reads the defect management table (PDL and SDL) stored in defect management areas (DMA) on the outer sides (respective two portions of the inner circumference side and the outer circumference side) of the data area, and performs skipping or replacement of the defective sector to establish a correspondence between PSN and LBA. In a DVD-RAM disk with a diameter of 120 mm and a capacity of 4.7 GB per side, the user data area is positioned at from PSN=31000h on the innermost circumference side to PSN=265F5Fh on the outermost circumference side. Within the area, the area at from 31000h to 341FFh is ensured as a primary spare area (PSA) for replacement of defective sectors. The PSA includes 12800 (3200h) spare sectors. In a DVD-RAM, it is possible to ensure a supplementary spare area (SSA) at the outermost circumference in addition to the PSA. In this example, the SSA of 49152 sectors at from PSN=259F60 to PSN=265F5F is ensured at the outermost circumference. As a result, the user data area actually specifiable ranges from PSN=34200h to PSN=259F5Fh. Within this range, 2252128 sectors are included. However, the DVD-RAM disk is configured in accordance with the zone CLV scheme. Therefore, 2245920 sectors, except for guard areas of the zone boundary portions, serve as user sectors. Accordingly, the user sectors are in correspondence with LBAs of LBA=0 (PSN=34200h) to LBA=2245919 (PSN=259F5Fh).

The defect management tables are of two types: a PDL (primary defect list) and a SDL (secondary defect list) (FIGS. 11(a) and 11(b)). In general, the PDL is used for registering the initial defects found at shipment of the medium or at certification. The PSN of each defective sector is recorded in the PDL, so that the read and write drive does not assign an LBA to the sector having the PSN listed in the PDL (Slipping). The read and write drive assigns LBAs thereto so that the user data area encroaches into the PSA by the area corresponding to the sectors subjected to such Slipping. To be precise, the beginning portion of the user data area undergoes a little surplus shift in excess of the area corresponding to the number of entries registered in the PDL into the PSA. This is attributable to the following fact: the DVD-RAM is radially divided into a plurality of recording zones, and if fractional sectors which fall short of the defect management block (16 sectors) are left at the boundary portion of the zone, the portion cannot be specified. Namely, the beginning of the user data area shifts in the direction in which the PSN is smaller than PSN=34200h (toward the inner circumference).

In the PDL, 7679 items of defect sector information can be registered at a maximum. The read and write drive registers the defects found during use in the SDL and assigns their respective spare blocks thereto. In this step, replacement is performed in a unit of the error correction code made up of 16 sectors. The SDL lists the one-to-one correspondence between the PSN of the top sector of each defective block and the address of the top sector of its corresponding replacement address. The SDL can register the defective information of 3837 blocks. The write and read drive successively registers the defects found during use in the SDL. Therefore, the SDL is to be rewritten about 4000 times corresponding to the number of registrable entries.

In general, the DVD-RP~N can be rewritten about 100000 times, and hence about 4000 occurrences of rewriting do not matter at all. However, for a phase-change type recording medium, such as a DVD-RAM, delicate adjustment of the laminate structure for suppressing the material flow of recording layer materials, or a specific layer for inhibiting the mixing of the recording layer and protective layer materials becomes necessary in order to perform rewriting a large number of times. Accordingly, delicate adjustment of the composition of the medium recording layer or the laminated structure becomes absolutely necessary, causing an increase in media production cost. Namely, the media price is increased.

Conversely, if the rewrite count is restricted to several hundred to several thousand, the delicate adjustment of the composition of the medium recording layer or the laminated structure becomes unnecessary. Accordingly, the laminated structure is simplified, or the media production margin is expanded. As a result, it becomes possible to provide a very low-priced medium.

Therefore, in this example, it is assumed that a medium with an overwrite cyclability of from about several hundred times to thousand times is used as a low-cost medium.

For example, for an overwrite cyclability of 1000 times, if a part of the user data area is frequently rewritten (actually, there is an area which is frequently rewritten even in the case of ordinary use in a part of a file system), the recording layer characteristics in the area are deteriorated, resulting in a read or write error. However, the DVD-RAM has a defect management function. Therefore, such a defective area is handled as a defect, and hence an undeteriorated spare Sector (spare block) is assigned thereto. Since such assignment can be performed for every deterioration, the overwrite cyclability effective from the viewpoint of a user can be ensured to be one hundred thousand times or more. However, reassignment of the spare area is repeatedly performed, and rewriting of the SDL is required for each reassignment step. Therefore, the SDL itself may be deteriorated. In a DVD-RAM, replacement of the SDL itself is not performed. Accordingly, the SDL information is lost at the worst, so that the information of the whole recording medium may become inaccessible. Thus, in this example, the following recording medium was used so that a medium having a restriction on its overwrite availability may be used in a conventional system with no problem (see FIG. 4):

(1) A total of 12800 sectors of the 4096 sectors (PSN= 34200h–PSN=351FFh) at the beginning portion of the user data area and the 8704 sectors (PSN=32000h–PSN=34200h) to be used at first within the PSA have been set to be an unrecordable area.

(2) The 4096 blocks (65536 sectors) at PSN=255F60h to PSN=265F5Fh at the rearmost portion of the user area have been set to be an unrecordable area.

(3) The unrecordable area has been implemented by setting the ID error detection data (IED) (see FIG. 8) of the ID which is the address data so as to indicate mismatch.

(4) The SSA has not been assigned. Therefore, the rearmost portion of the user data area is located at a position where PSN=265F5Fh. (Total number of user sectors is 2295072.)

(5) A total of 7679 sectors of the known defective sectors other than those described in the foregoing items (1) and (2) and a part of the unrecordable sectors of (1) have been previously registered as P-List in the PDL. Therefore, the beginning portion of the user area shifts from the position where PSN=34200h to the side on which the PSN is reduced by about 7670 sectors. Namely, the physical user area top sector (LBA=0) is located in the vicinity of a position where PSN=32400h.

(6) Within the area described in the foregoing item (2), 3734 blocks (except for the recording block corresponding to the position where LBA=2294815) have been previously registered in the SDL. However, upon registration, an SLR flag was set to 1 bit, and no spare sector has been assigned thereto.

(7) The recording block corresponding to LBA=256, LBA=512, and LBA=final LBA−256=2294815 have been previously registered in the SDL, and assigned spares. In this step, the portion extending from the position where PSN=31640h to the position where PSN=3167Fh was utilized for replacement.

(8) Logical formatting was previously performed with a UDF file system. In this step, the 12288 sectors (3000h) at the beginning of the user data area and the 65536 sectors (1000h) at the rearmost thereof were not used.

(9) The overwrite cyclability of the medium (recording layer) was set to be not less than 300 times.

Below, the principle of operation of this example will be described. In this example, an unrecordable area is present. However, since the unrecordable area is not present in a logical user area (logical volume space), which is the user recording area after logical formatting, there is no problem for common use. For the UDF format, the layout positions of only a Volume Recognition Sequence (VRS) and an AVDP (Anchor Volume Descriptor Pointer) are determined, and the VRS is to be recorded at LBA=16, and the AVDP5 are to be recorded at two or more positions out of the positions where LEA=256, LBA=512, and LBA=N−256 (where N is the final LBA). For the 4.7 GB DVD-RAM, to which this example relates, the AVDP5 are recorded at the two positions where LBA=256 and LBA=2294815. In the AVDP, the layout positions of two main and spare volume descriptor sequences (VDSs) are recorded. In this example, the VDSs have been located at 16 sectors beginning at LBA=12288, and 16 sectors beginning at LBA=12288+16. At the subsequent sectors, an LVID (logical volume integrity descriptor) has been located, and the logical volume space has been located so as to begin at LEA=12288+256, and end at LBA=2229279 (=2295072−65536−1). Namely, the number of sectors which belong to the logical user area after logical formatting is 2216992, and the capacity thereof (logical volume space) is about 4.54 GB. In the logical volume space, a space bit map, a file set descriptor, a directory, a user file, and the like are located.

In this example, the sectors where LBA=256 and LBA=2294815 for describing the AVDPs, and the sector where LEA=16 for the VDS are basically located in the unrecordable area. However, the LBAs have previously been assigned for replacement to the area outside the unrecordable area in the PSA. Therefore, actually, they are recorded in the assigned replacement recording block (at from PSN=31640h to PSN=3167Fh). Other file system data are all assigned to the area which is not unrecordable in the user area.

If another defective sector occurs due to deterioration caused by rewriting, adhesion of contaminants, or the like during use of the medium, the sectors at from PSN=3163Fh to PSN=31000h are successively assigned as replacement areas. In this example, the sectors at PSN=3164 Oh to PSN=3167Fh have previously been assigned and registered as replacement sectors. Therefore, the area between PSN=31680h and PSN=341FFh in the PSA is regarded as a used spare area, and hence they are not to be assigned as replacement sectors. For this reason, the defect management can be performed with respect to a newly occurred defect with no problem. In this example, only the 100 blocks (64 Oh) at PSN=3163F to 31000h are used as a spare area. The spare area is present only for 100 blocks. Therefore, the number of cycles for performing replacement assignment is 100 at maximum. Namely, the SDL rewrite count is also restricted to 100.

In the DVD-RAM, there is provided a function of performing only registration of a defect, but not performing a replacement assignment, other than the replacement assignment. In this case, the defect is to be registered in the SDL in the same manner as with the replacement. However, the replacement assignment is not performed, and the flag SLR is set to "1", thereby indicating that the replacement assignment has not been performed (see FIG. 11(b)). Even in this case, the defect is registered as an entry in the SDL, and hence the SDL is rewritten. In this example, 4 blocks for replacement assignment as in item (5), and only 3733 defects each with an SLR flag as in item (8) have been previously registered in the SDL. Therefore, the number of residual entries registrable in the SDL, which has a maximum number of registrable defects of 3837, is 100. Accordingly, the number of defects to be registered with the SLR is also restricted to 100 at a maximum.

Depending upon the conditions of use, the following worst case is conceivable. Namely, as a combination of replacement registration and SLR registration, at first, 100 SLR registrations are performed, and then, the 100 defects registered with SLRs are successively subjected to replacement assignment. The 100 replacement blocks are deteriorated, or the like, and an attempt is made to perform reassignment. However, the replacement blocks have been depleted. Therefore, all are changed into SLR again.

In this example, the number of the SDL rewrite count is also restricted to 100×3=300 with respect to the worst case. Therefore, in the medium of this example, which is capable of being rewritten 300 times or more, there is no fear that the SDL itself is deteriorated. Accordingly, it is possible to use the medium of the present invention in a conventional write and read drive or file system with no problem.

Conversely, if the number of replacement blocks and the number of residual entries registrable as defects in the SDL are restricted to one third of the overwrite cyclability of the medium, the SDL update count will not exceed the overwrite cyclability of the medium.

The PDL will not be rewritten basically unless reformatting is performed, even if new defect registration or replacement is performed.

Therefore, by using the recording medium satisfying the conditions described in the foregoing items (1) to (9), it is possible to restrict the rewrite count of the defect management area so as not to exceed the allowable number of cycles of replacement.

EXAMPLE 2

Now, consideration will be given to the case where the medium of the foregoing example is reformatted by mistake. The reformatting process is of two types: a logical formatting process for restructuring only a file system, and a physical formatting process for initializing the SDL for defect management. First, the former logical formatting process will be considered. In the case where logical formatting is performed with a conventional method, with a conventional logical formatter which is a conventional application, most of the file system data is located in the vicinity of the beginning of the user area, i.e., in the vicinity of from LBA=0 to LBA=512, and the user file is also recorded from the vicinity of LEA=256. However, about 256 blocks in the vicinity of the beginning of the user area (except for about 7680 sectors registered in the PDL out of the sectors from the vicinity of PSN=32400h to PSN=35200h) are unrecordable, and hence replacement is performed therefor, so that respective spare areas are assigned thereto. However, the number of the 256 blocks is larger than 100, which is the number of the spare areas. Accordingly, after all, spare area overflow is caused immediately after use, resulting in a recording error. Consequently, the user immediately notices that the medium cannot be reformatted and used. Therefore, substantially, the user cannot reformat and use the medium of this example.

Figure 7:
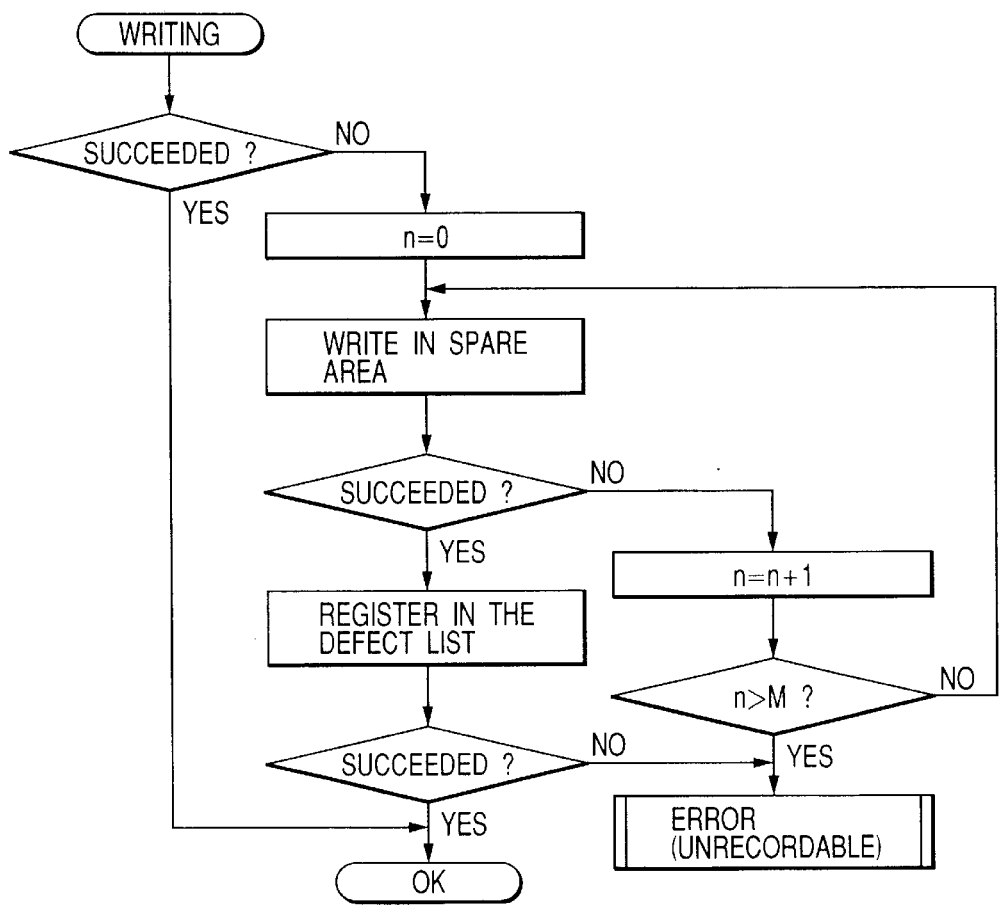
FIG. 7 is a flowchart illustrating the operation of the present invention.
Figure 9:
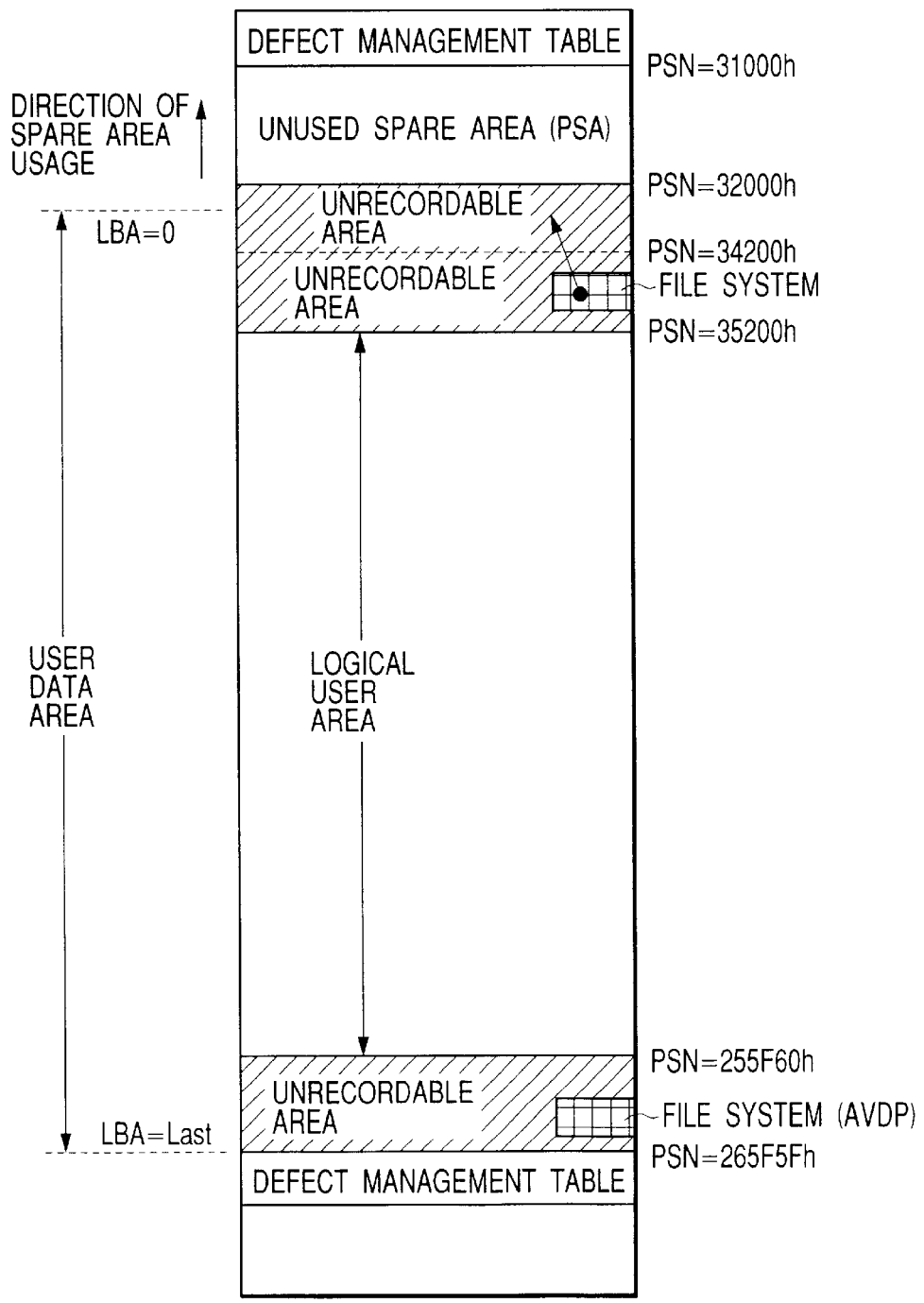
FIG. 9 is a diagram showing an example of the information recording medium of the present invention, which has been logically formatted with a conventional device.

Now, the case of physical formatting will be considered. If physical formatting is performed, the information of the SDL is lost, but the P-List in the PDL is stored. Therefore, the sectors ranging from the vicinity of PSN=32400h are used for the spare area, as shown in FIG. 9. If an attempt is made to record the file system after physical formatting, the recording cannot be performed because, for example, the sector corresponding to LSN256 is in the unrecordable area. Consequently, the replacement as shown in FIG. 7 is to be performed. However, the replacement area is also in the unrecordable area. Accordingly, after several (M) tries, the formatting is abnormally terminated, i.e., erroneously terminated as shown in the lower right section of FIG. 7 after all. Consequently, the user cannot re(physical)-format and use the medium of this example.

The DVD-RAM has a function of SSA expansion/assignment for adding a spare area afterward when the spare area has been depleted. However, in this example, even if the SSA has been assigned, the portion in the vicinity of the final PSN which is the beginning portion of the SSA to be used is unrecordable. Therefore, even if an attempt is made to assign the spare area to the SSA, recording ends in failure. Consequently, it is also impossible to use the SSA.

Alternatively, re(physical)-formatting can also be accomplished by translation of the SDL to the PDL. However, in this example, since the PDL has been filled with the P-List from the beginning, after all, reformatting cannot be achieved by this method.

Further, there can be also adopted a method of performing certification upon formatting. However, the formatting with certification will not be performed successfully for the medium of this example, in which the PDL has been filled with the P-List, and the total number of unrecordable areas is larger than the number of SDL registrable entries.

Thus, the user cannot reformat and use the medium with any methods, so long as a conventional formatting application is used. However, it is possible to perform the erasing operation of a conventional file even without reformatting, and hence there is no inconvenience for use. Therefore, it suffices that it is made known to the user at the point of sale thereof that the medium of this example is unreformattable, and there is no particular fear that confusion may be caused. Further, even in the case where a user may attempt to perform reformatting by use of a wrong operation, the user immediately notice it. Therefore, there is no risk that the whole user data is lost due to deterioration of the medium caused by continued wrong use.

Of course, not only will the user notice from a package or the like that the medium is unusable upon reformatting, but also the medium is desirably described as such on its labeled side, or the like, of the medium. If possible, another method is desirably adopted in combination therewith in which the color of the label or the color of the cartridge is made different from that of the conventional reformattable medium so as to make it easier to discriminate them.

EXAMPLE 3

Figure 6:
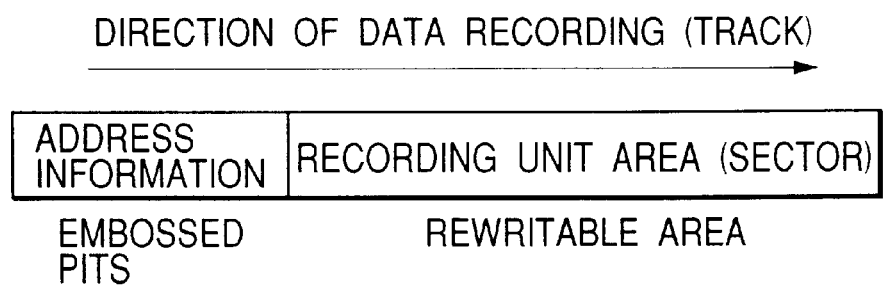
FIG. 6 is a diagram showing the manner in which address information is arranged.

An example of a method of forming the unrecordable area will be considered. In the DVD-RAM, as shown in FIG. 6, the physical ID (address information) is arranged in the form of an embossed pit at the beginning of each recording sector. For ensuring reliability, the address information for identifying one sector is recorded quadruply.

The write and read drive judges the address to be correct even if only one of the quadruple address information is readable. Therefore, all the quadruple address information is set so as not to be normally read in order to make the sector unrecordable.

Figure 8:
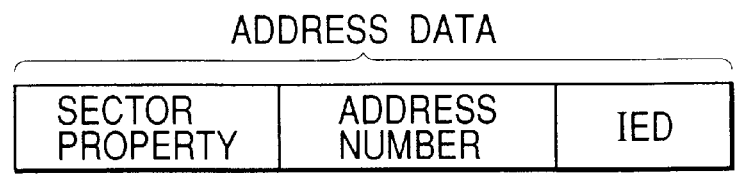
FIG. 8 is a diagram showing another manner in which address information is arranged.

As a method of preventing each address from being normally read, the ID corresponding to an ID error detection code (IED) added to each address information has been set to be mismatched therewith, as shown in FIG. 8. Specifically, the IED obtained by adding one to the proper matched IED has been used. Thus, the logical method in which the IED is set to be mismatched can be applied for mastering of the medium. It can be automatically applied to all of the media simultaneously with substrate formation. Therefore, it can be advantageously carried out without an increase in cost. In this example, a means for adding one to the IED was adopted. However, alternatively, a method may be adopted in which 1 byte at the beginning of each ID is replaced by another one after conversion into a code word (channel bit). Which method can be more easily performed depends upon the circuit configuration of the formatter for use in mastering.

In this example, the first two sectors and the last three sectors in one track have been at least set to be readable in stead of setting all the IDs in the unrecordable areas to be unreadable. More specifically, it was so configured in the inner circumferential portion that the first two sectors have been readable, the subsequent eight sectors unreadable, the subsequent four sectors readable, the subsequent eight sectors unreadable, and the last three sectors readable. For the application of this configuration to the outer circumferential portion, the first two sectors have been set readable, the subsequent ten sectors unreadable, the subsequent five sectors readable, the subsequent ten sectors unreadable, four sectors readable, ten sectors unreadable, five sectors readable, ten sectors unreadable, and the last three sectors readable. Thus, since the addresses of a part of the track are set to be readable, there is no obstruction to access. Further, in this example, since the sectors in the vicinity of the beginning and the end of the track are set to be readable, the ID information of the switching portion between a land and a groove can be read with reliability. Therefore, the stability of servo control can be ensured. Furthermore, not less than eight consecutive ID unreadable sectors are arranged. Consequently, the IDs of at least eight sectors in one ECC block (error correction code block) are unreadable. Still further, it is so configured that at least six consecutive unreadable sectors thereof are arranged. There is also present a system so configured that even if an ID unreadable sector occurs during a write operation, the write operation is performed by automatically interpolating it according to the write and read drive. However, even in such a system having an interpolation function, it is possible to cause a recording error with reliability by arranging not less than several consecutive ID unreadable sectors. Namely, it is possible to intentionally form an unrecordable area.

Alternatively, in contrast to this example, there are also other methods in which the IDs of the whole circumference are set to be unreadable, and totally different addresses are to be read. In either case, the area becomes inaccessible, or unreadable.

EXAMPLE 43

As a method for making the ID portion unreadable in Example 3, the ID portion was exposed to recording power to generate a phase change mark. As a result, the ID portion varied in signal level so as to be unreadable. This method does not require modification of a stamper for a disk. Accordingly, if disks are found to be low in overwrite cyclability after small-volume sample production or media production, they can be reused as low-priced media in place of being discarded as defective products, so that effective utilization of resources can be achieved. Further, it is also possible to ship even the disks manufactured under a low-yield adverse production environment as disks of different performances according to their qualities by using this method.

For application of this method, it is desirable from the viewpoint of production efficiency to use a device capable of simultaneously forming marks on the PIDs of a plurality of tracks such as an initialization device.

EXAMPLE 5

Instead of making the ID portion unreadable in Example 3, the track at which a total of 5-byte data of PS (PreSYNC) and SYO, which are synchronization signals at the beginning of the sector in the recording area, i.e., guide groove, was intermittently formed. For a DVD-RAM, the position at which a synchronization signal is recorded is the position about 60 bytes away from the header portion. Guide grooves for forming the 20-byte track between the 50th byte and the 70th byte were intermittently formed in a 5 channel bit period because of the occurrence of fluctuations in rotation or 8-bite recording position shift for improving the overwrite cyclability. Consequently, reproduced signal level fluctuations in the vicinity of the synchronization signal are intensified, and hence it is impossible to detect the synchronization signal upon reading. As a result, about 100-byte data in the vicinity of the beginning of the sector becomes unreadable with reliability because the PS and the SYO are absolutely necessary for detecting the beginning portion of the recording area of the sector. If the 100-byte data at the beginning of each sector becomes unreadable, the recorded data substantially becomes unreadable. With this method, only a 20-byte area per sector, i.e., a little less than 1% area of a track, is merely set to be different from the normal one. Therefore, there is no danger of adversely affecting a servo operation or access, and hence it is possible to continuously process a large volume of sectors.

Accordingly, for example, it is also possible to use a burst cutting method in which a part of a recording layer is burnt off by using a-high-power layer for recording a bar code (BCA) in place of making the track intermittent as described above. This method is suitable for either large-volume production or low-volume production because it can process one disk for a short time.

EXAMPLE 6

Figure 10:
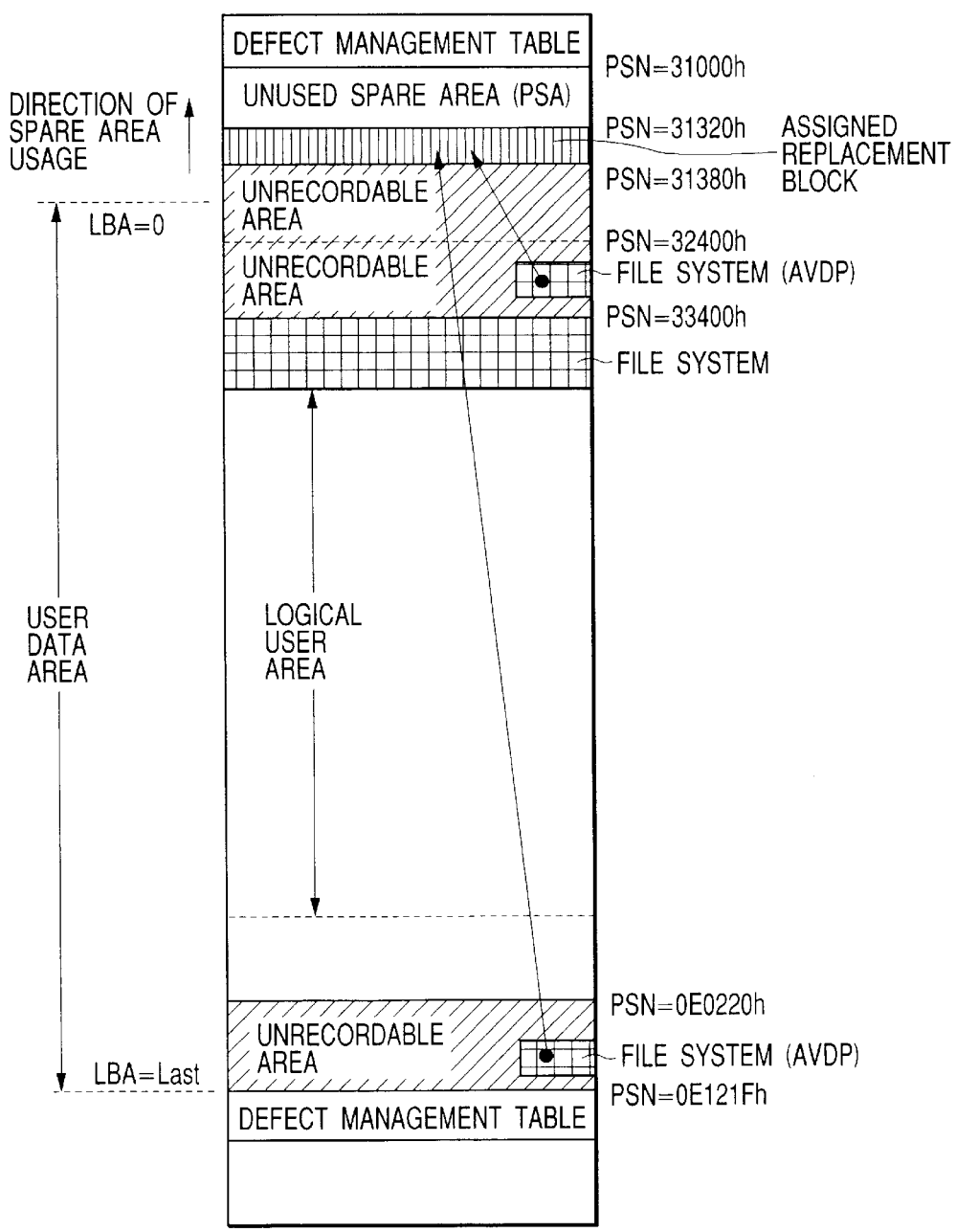
FIG. 10 is a diagram showing an example of the logical format of the information recording medium of the present invention.

An example of the application to a 80-mm-dia DVD-RAM is shown in FIG. 10. A recording medium thereof has the following configuration:

(1) The recording blocks (8320 sectors in total) of the beginning portion (4096 sectors) of the user area, and the sectors at from PSN=31380h to PSN=333FFh belonging to the PSA have been set to be an unrecordable area.

(2) The 4096 sectors (256 blocks) at PSN=0E0220h to 0E121Fh at the rearmost portion of the user area have been set to be an unrecordable area.

(3) The foregoing unrecordable areas have been implemented by setting the ID error detection data (IED) (see FIG. 8) of the ID, which is the address data, so as to indicate a mismatch.

(4) The SSA has not been assigned thereto. Therefore, the rearmost portion of the user data area is located at PSN 0E121Fh. (Total number of user sectors is 714480.)

(5) A total of 4095 sectors of the known defective sectors other than those described in the foregoing items (1) and (2) and a part of the unrecordable sectors described in the item (1) have been previously registered as P-List in the PDL. Therefore, the beginning portion of the user area shifts from the position where PSN=32400h to the side on which the PSN is reduced by about 4095 sectors. Namely, the physical user area top sector (LBA=0) is located in the vicinity of a position where PSN=31400h.

(6) The last 3334 blocks in the user data area(except for the recording block corresponding to LBA=714223) have been previously registered in the SDL. However, upon registration, an SLR flag has been set to "1", and a spare sector was not to be assigned thereto.

(7) The recording blocks corresponding to LBA=16, LBA=256, LBA=512, and LBA=final LBA−256=714223 have been previously registered in the SDL, and each was assigned a spare. In this step, the sectors at from PSN=31320h to PSN=3234Fh have been utilized for replacement.

(8) Logical formatting has been previously performed with a UDF file system. In this step, the 8448 sectors (2100h) at the beginning of the user data area and the 53344 sectors (3334 blocks) at the rearmost portions thereof were not to be used.

(9) The overwrite cyclability of the medium (recording layer) has been set to be not less than 600 times.

Below, the principle of operation of this example will be described. In this example, the unrecordable area is also present similarly in Example 1. However, since the unrecordable area is not present in a logical user area (logical volume space), which is the user recording area after logical formatting, there is no problem for common use. For the UDF format, the layout positions of only a Volume Recognition Sequence (VRS) and an AVDP (Anchor Volume Descriptor Pointer) are determined, and the VRS is to be recorded at LEA=16, and AVDPs are to be recorded at two or more positions out of the positions where LBA=256, LBA=512, and LBA=N−256 (where N is the final LBA). For the 80-mm-dia DVD-RAM, which is the case of this example, the AVDPs are recorded at two positions where LBA=256 and LBA=714223. In the AVDP, the layout positions of two main and spare volume descriptor sequences (VDSs) are recorded. In this example, the VRSs have been located at 16 sectors beginning at LBA=8488, and 16 sectors beginning at LBA=8448+16. In the subsequent sectors, an LVID (logical volume integrity descriptor) has been located, and the logical volume space has been located so as to begin at LBA=8704, and end at LBA=661135. Namely, the user capacity after logical formatting (logical volume space) is about 1.33 GB. In the logical volume space, a space bit map, a file set descriptor, a directory, a user file, and the like are located.

In this example, the sectors where LBA=256 and LBA=714223 for describing the AVDPs, and the sector where LBA=16 for the VRS are basically located in the unrecordable area. However, the LBAs have previously been assigned for replacement to the area outside the unrecordable area in the PSA. Therefore, actually, they are recorded in the assigned replacement recording block (PSN=31320 to 3135Fh). Other file system data are all assigned to the area which is not unrecordable in the user area.

If another defective sector occurs due to deterioration caused by rewriting, adhesion of contaminants, or the like during use of the medium, the sectors at from PSN=3131Fh to PSN=31000h are successively assigned thereto as replacement areas. In this example, the sector at PSN=31320h has previously been assigned and registered as a replacement sector. Therefore, the area between PSN=31360h and PSN=32400h in the PSA is regarded as a used spare area, and hence the sectors are not to be assigned as replacement sectors. For this reason, the defect management can be performed with respect to a newly occurred defect with no problem. In this example, only the 50 blocks (320 sectors) at from PSN=3131Fh to 31000h are used as a spare area. The spare area is present only for 50 blocks. Therefore, the replacement assignment count is 50 at maximum. Namely, the SDL rewrite count associated with replacement assignment is also restricted to 50.

In the DVD-RAM, there is provided a function of performing only registration of a defect, but not performing replacement assignment, other than the replacement assignment. In this case, the defect is to be registered in the SDL in the same manner as with the replacement. However, the replacement assignment is not performed, and the flag SLR is set to "1", thereby indicating that the replacement assignment has not been performed (see FIG. 11 (b)). Even in this case, the defect is registered as an entry in the SDL, and hence the SDL is rewritten. In this example, four blocks for replacement assignment as in the item (5) and only 3333 defects each with an SLR flag as in the item (8) have previously been registered in the SDL. Therefore, the number of residual entries registrable in the SDL which has a maximum number of defects registrable of 3837 is 500. Accordingly, the number of defects to be registered with SLR is also restricted to 500 at a maximum.

Depending upon conditions of use, the following worst case is conceivable. Namely, as a combination of replacement registration and SLR registration, at first, 500 SLR registrations are performed, and then, the 50 defects out of the defects registered with SLRs are successively subjected to replacement assignment. The 50 replacement blocks are deteriorated, or the like, and an attempt is made to perform reassignment. However, the replacement blocks have been depleted. Therefore, all are changed into SLR again.

In this example, the SDL rewrite count is also restricted to 500+50+50=600 even with respect to the worst case. Therefore, in the medium of this example, which is capable of being rewritten 600 times or more, there is no fear that the SDL itself is deteriorated. Accordingly, it is possible to use the medium of the present invention in a conventional write and read drive, or a file system, with no problem.

Conversely, if the sum of twice the number of replacement blocks and the number of residual entries registrable as defects in the SDL is restricted to not more than the overwrite cyclability of the medium, the SDL update count will not exceed the overwrite cyclability of the medium.

The PDL will not be rewritten basically unless reformatting is performed, even if new defect registration or replacement is performed.

Therefore, by using the recording medium satisfying the conditions described in the foregoing items (1) to (9), it is possible to restrict the defect management area rewrite count so as not to exceed the allowable number of cycles of replacement.

EXAMPLE 7

In this example, unrecordable areas were arranged to be dispersed throughout the user area, and the information of the existing position thereof was recorded as disk manufacturer's information on a disk as read-only data. In this example, an example of a special-purpose device driver is shown. The special-purpose device driver has functions of reading the existing position data of the unrecordable areas from the data on the medium, and then registering the data as an invisible file so that the unrecordable area may not encroach on the user area, and performing address translation to perform read and write operations. Further, simultaneously, by reading the information on the overwrite cyclability of the medium from the data on the medium, it is possible to restrict reformatting or restrict the recording method according to the overwrite cyclability of the medium. The recording method can be restricted in the following manner. For example, random recording is not performed, and the recording method is restricted to sequential recording as with a CD-R, and, as a result, it is possible to remarkably reduce the overwrite cyclability of the medium.

This example is characterized by the following fact. Namely, unrecordable (write restricted) areas are present in various portions in the user area. By utilizing this configuration, it is set that read and write operations cannot be performed in a conventional device driver, so that it becomes necessary to perform read and write operations with only special-purpose software. By utilizing this fact, it becomes possible to construct, for example, the special-purpose system as shown in the upper right section of FIG. 1. With the special-purpose system, it becomes possible to use only a file system based on sequential recording so that the rewrite count of a part of the medium may not be increased extremely.

EXAMPLE 8

Figure 1:
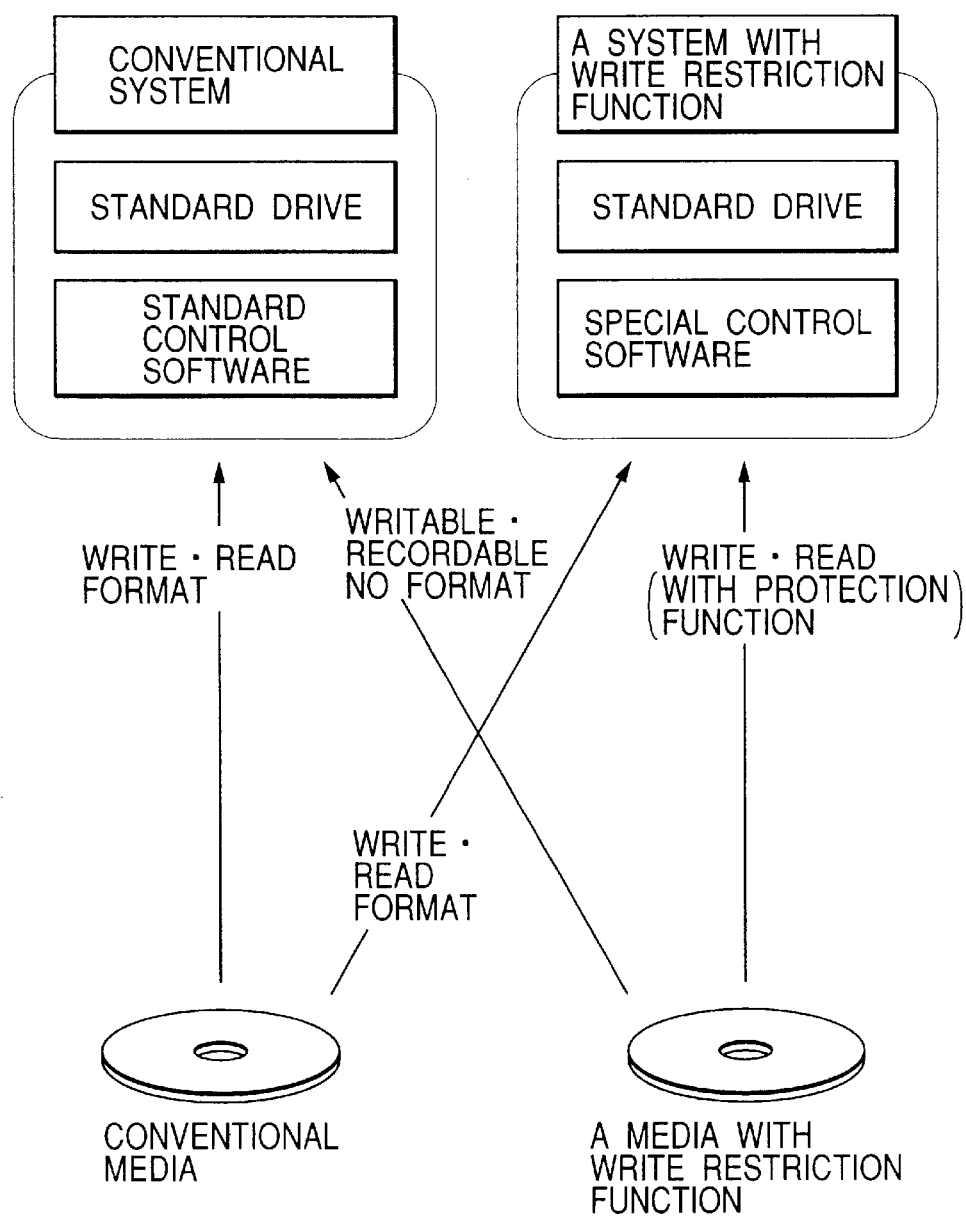
FIG. 1 is a diagram illustrating the object and the effect of the present invention.

The concept of an optical recording system of the present invention will be described by reference to FIG. 1.

As for a conventional medium, it can be written, and read by using standard control software (ex., a device driver included with OS) with a standard read and write drive. On the other hand, for a low-priced medium that has a restriction on its overwrite cyclability, as in Examples 1 to 6, a specific area on the medium is made unrecordable, and the medium is previously subjected to specific logical formatting to be shipped. Consequently, it is possible to restrict the operation of standard control software. Under such circumstances, even in case a user attempts to reformat and use the medium, the user cannot substantially use it because of the unrecordable area. Therefore, it is possible to eliminate the risk that the low-priced medium having a restriction on its overwrite cyclability will be used with the user's own format or driver, and, as a result, the user data is corrupted or lost.

Of course, if a standard drive is used in combination with such special-purpose control software, as in Example 4, it is also possible that the user will reformat and use the medium, and it is possible to sufficiently ensure the substantial rewrite count the user bodily senses by cache management or the like.

In any case, the present invention is characterized in that a medium with a write and read function is so configured as to be written and read with a conventional drive (standard drive) with security.

By using the present invention as described above, it is possible to easily implement the extension of a write protection function, or the like, without changing hardware or physical specifications. In addition, it is possible to provide a secure optical recording system having no danger of being wrongly written or causing data corruption with a conventional drive which does not recognize the presence of the extension.

The effect of the present invention is not limited to the foregoing examples in this regard, the unrecordable area formation method described in Example 2 is not limited to IED mismatching. For example, a pit or the like may be provided in a part of a recording track. Alternatively, the recording layer may be formed by being modified by an intense laser light, or the like. In Examples 1 and 3, the number of usable blocks in the PSA is set to be 253, but this number may be varied according to the overwrite cyclability of the medium. For example, if a medium having an overwrite cyclability of 100 times is used, the initial registration for the SDL may be performed so that the number of usable blocks in the PSA is 100 or less. With the method of this example, for example, it is difficult to suppress the deterioration of a trial write area. Therefore, if possible, desirably, the rewrite count of about 1000 times is ensured, and the number of usable blocks in the PSA is also set to be about 1000. In such a case, the arrangement of the disabled areas, or the like, of the medium may be changed from the one described above, or may not be changed. Although an example was described in which the UDF for random recording was used as a file system (logical format), it is also possible to use a file system for write-once recording or for sequential recording. In such a case, for example, it is recommendable to use a cipher so as to allow the operation with only a specific device driver, as in Example 4. Further, in the foregoing examples, a description was given of a DVD-RAM as a conventional optical disk. However, the technology described above is basically applicable to all rewritable media.

According to the present invention, an information recording and reproducing system, comprising: an information recording medium having a write and read restriction comprising at least two or more independently writable and readable user recording blocks, out of the user recording blocks, at least one or more blocks being an unrecordable, unreadable, or inaccessible restricted block; and a computer system or a write and read drive having a processing function for performing read and write control such that an area except for the restricted blocks is a substantial user area, the information recording medium being used in the computer system or the write and read drive.

According to a feature of the information recording and reproducing system as described above, the restricted blocks are substantially excluded from the user area by registering the restricted blocks as defects.

According to another feature of the information recording and reproducing system as described above, the restricted blocks are substantially excluded from the user area by registering the restricted blocks as invisible files.

In accordance with the present invention, an information recording and reproducing system includes an information recording medium having a write and read restriction comprising at least two or more independently writable and readable user recording blocks, out of the user recording blocks, at least one or more blocks being unrecordable, unreadable, or inaccessible restricted blocks; and a means having a processing function for reading encoded data or encrypted data stored on the recording medium, and decoding or decrypting the read data to obtain the layout information of the restricted blocks, and performing at least one of write and read control or logical format such that all the restricted blocks are not substantially user areas based on the restricted block layout information obtained by using the information recording medium.

Further, the present invention is directed to an information recording medium which includes at least a plurality of independently writable and readable user recording blocks; spare blocks each for replacing a user recording block having a defect; and at least a defect management table recording area for recording the relationship between the defective blocks and the spare blocks, wherein the number of the spare blocks is set to be smaller than the overwrite cyclability of the recording medium.

The present invention is also directed to an information recording medium, which includes at least a plurality of independently writable and readable user recording blocks; spare blocks each for replacing a user recording block having a defect; and at least a defect management table recording area for recording the relationship between the defective blocks and the spare blocks, wherein a plurality of the defective blocks and the spare blocks are previously recorded in the defect management table, and the number of residual blocks registrable in the defect management table are set to be smaller than the overwrite cyclability of the recording medium.

According to a feature of the information recording medium as described above, the sum of the number of the spare blocks and the number of residual blocks registrable in the defect management table is set to be smaller than the overwrite cyclability of the recording medium.

According to another feature of the information recording medium as described above, the number of the spare blocks and the number of residual blocks registrable in the defect management table are respectively set to be smaller than one third of the overwrite cyclability of the recording medium.

The foregoing invention has been described in terms of Preferred embodiments. However, those skilled in the art will recognize that many variations of such embodiments exist. Such variations are intended to be within the scope of the present invention and the appended claims.

What is claimed is:

1. An information recording medium, comprising:
   at least two blocks of independently writable user recording blocks, and at least one block of the user recording blocks being an unrecordable restricted block;
   ones of the recording blocks having physical address data arranged thereon, the physical address data being made up of a code indicative of an address number and an address error detection code for verifying the correctness of the address number,
   wherein the code indicative of the address number is mismatched with the address error detection code for verifying the correctness of the address number in the restricted block.

2. The information recording medium according to An information recording medium, comprising:
   at least two blocks of independently writable user recording blocks, and at least one block of the user recording blocks being an unrecordable restricted block;
   ones of the recording blocks having physical address data arranged thereon, the physical address data being made up of a code indicative of an address number and an address error detection code for verifying the correctness of the address number,
   wherein the address number indicated by the physical address data is different from the address number of the restricted block in the restricted block.

3. An information recording medium, comprising:
   at least two blocks of independently writable user recording blocks, and at least one block of the user recording blocks being an unrecordable restricted block;
   wherein the user recording block is an error correction code block including a plurality of user sectors,
   wherein the user sectors individually have independent address numbers, and all the user recording blocks to which the user sectors having the smallest 257 numbers of the address numbers belong are at least unrecordable, restricted blocks.

4. The information recording medium according to claim 3, wherein the user sectors individually have independent address numbers, and all the user recording blocks to which the user sectors having the smallest 513 numbers of the address numbers belong are at least unrecordable, restricted blocks.

5. The information recording medium according to claim 3, wherein all the user recording blocks to which the user sectors having the largest 257 numbers of the address numbers belong are at least unrecordable restricted blocks.

6. An information recording medium, comprising:
   at least two blocks of independently writable user recording blocks, and at least one block of the user recording blocks being an unrecordable restricted block;
   wherein a total number of the restricted blocks on the information recording medium is set to be larger than a total number of the recording blocks registrable in a defect management table.

7. The information recording medium according to claim 1, wherein the information recording medium is at least one of: an optical recording medium, a CD (compact disk) optical recording medium, CD-ROM (read only memory) optical recording medium, a DVD (digital versatile disk) optical recording medium, a DVD-RAM (random access memory) optical recording medium, a DVD-ROM optical recording medium, a MO (magneto-optic) optical recording medium, a WORM (write once, read many) optical recording medium, a MO-WORM optical recording medium, and a CCW (continuous composite write) optical recording medium.

8. The information recording medium according to claim 2, wherein the information recording medium is at least one of: an optical recording medium, a CD (compact disk) optical recording medium, CD-ROM (read only memory) optical recording medium, a DVD (digital versatile disk) optical recording medium, a DVD-RAM (random access memory) optical recording medium, a DVD-ROM optical recording medium, a MO (magneto-optic) optical recording medium, a WORM (write once, read many) optical recording medium, a MO-WORM optical recording medium, and a CCW (continuous composite write) optical recording medium.

9. The information recording medium according to claim 3, wherein the information recording medium is at least one of: an optical recording medium, a CD (compact disk) optical recording medium, CD-ROM (read only memory) optical recording medium, a DVD (digital versatile disk) optical recording medium, a DVD-RAM (random access memory) optical recording medium, a DVD-ROM optical recording medium, a MO (magneto-optic) optical recording medium, a WORM (write once, read many) optical recording medium, a MO-WORM optical recording medium, and a CCW (continuous composite write) optical recording medium.

10. The information recording medium according to claim 6, wherein the information recording medium is at least one of: an optical recording medium, a CD (compact disk) optical recording medium, CD-ROM (read only memory) optical recording medium, a DVD (digital versatile disk) optical recording medium, a DVD-RAM (random access memory) optical recording medium, a DVD-ROM optical recording medium, a MO (magneto-optic) optical recording medium, a WORM (write once, read many) optical recording medium, a MO-WORM optical recording medium, and a CCW (continuous composite write) optical recording medium.

11. A system comprising:
    an information recording medium drive having mechanical components to at least one of: produce, read and write an information recording medium having at least one restricted block; and
    at least one information recording medium including:
        at least two blocks of independently writable user recording blocks, and at least one block of the user recording blocks being an unrecordable restricted block;
        ones of the recording blocks having physical address data arranged thereon, the physical address data being made up of a code indicative of an address number and an address error detection code for verifying the correctness of the address number,
        wherein the code indicative of the address number is mismatched with the address error detection code for verifying the correctness of the address number in the restricted block.

12. The system according to claim 11, wherein the information recording medium is at least one of: an optical recording medium, a CD (compact disk) optical recording medium, CD-ROM (read only memory) optical recording medium, a DVD (digital versatile disk) optical recording medium, a DVD-RAM (random access memory) optical recording medium, a DVD-ROM optical recording medium, a MO (magneto-optic) optical recording medium, a WORM (write once, read many) optical recording medium, a MO-WORM optical recording medium, and a CCW (continuous composite write) optical recording medium.

13. A system comprising:
an information recording medium drive having mechanical components to at least one of: produce, read and write an information recording medium having at least one restricted block; and
at least one information recording medium including:
at least two blocks of independently writable user recording blocks, and at least one block of the user recording blocks being an unrecordable restricted block;
ones of the recording blocks having physical address data arranged thereon, the physical address data being made up of a code indicative of an address number and an address error detection code for verifying the correctness of the address number,
wherein the address number indicated by the physical address data is different from the address number of the restricted block in the restricted block.

14. The system according to claim 13, wherein the information recording medium is at least one of: an optical recording medium, a CD (compact disk) optical recording medium, CD-ROM (read only memory) optical recording medium, a DVD (digital versatile disk) optical recording medium, a DVD-RAM (random access memory) optical recording medium, a DVD-ROM optical recording medium, a MO (magneto-optic) optical recording medium, a WORM (write once, read many) optical recording medium, a MO-WORM optical recording medium, and a CCW (continuous composite write) optical recording medium.

15. A system comprising:
an information recording medium drive having mechanical components to at least one of: produce, read and write an information recording medium having at least one restricted block; and
at least one information recording medium including:
at least two blocks of independently writable user recording blocks, and at least one block of the user recording blocks being an unrecordable restricted block;
wherein the user recording block is an error correction code block including a plurality of user sectors,
wherein the user sectors individually have independent address numbers, and all the user recording blocks to which the user sectors having the smallest 257 numbers of the address numbers belong are at least unrecordable restricted blocks.

16. The system according to claim 15, wherein the user sectors individually have independent address numbers, and all the user recording blocks to which the user sectors having the smallest 513 numbers of the address numbers belong are at least unrecordable restricted blocks.

17. The system according to claim 15, wherein all the user recording blocks to which the user sectors having the largest 257 numbers of the address numbers belong are at least unrecordable restricted blocks.

18. The system according to claim 15, wherein the information recording medium is at least one of: an optical recording medium, a CD (compact disk) optical recording medium, CD-ROM (read only memory) optical recording medium, a DVD (digital versatile disk) optical recording medium, a DVD-RAM (random access memory) optical recording medium, a DVD-ROM optical recording medium, a MO (magneto-optic) optical recording medium, a WORM (write once, read many) optical recording medium, a MO-WORM optical recording medium, and a CCW (continuous composite write) optical recording medium.

19. A system comprising:
an information recording medium drive having mechanical components to at least one of: produce, read and write an information recording medium having at least one restricted block; and
at least one information recording medium including:
at least two blocks of independently writable user recording blocks, and at least one block of the user recording blocks being an unrecordable restricted block;
wherein a total number of the restricted blocks on the information recording medium is set to be larger than a total number of the recording blocks registrable in a defect management table.

20. The system according to claim 19, wherein the information recording medium is at least one of: an optical recording medium, a CD (compact disk) optical recording medium, CD-ROM (read only memory) optical recording medium, a DVD (digital versatile disk) optical recording medium, a DVD-RAM (random access memory) optical recording medium, a DVD-ROM optical recording medium, a MO (magneto-optic) optical recording medium, a WORM (write once, read many) optical recording medium, a MO-WORM optical recording medium, and a CCW (continuous composite write) optical recording medium.

* * * * *